United States Patent [19]

Kimura et al.

[11] 4,106,595

[45] Aug. 15, 1978

[54] DISC BRAKE CALIPER AND SUPPORTING MEMBER

[75] Inventors: Toshihiko Kimura; Tsuneo Nakayama, both of Iwatsuki, Japan

[73] Assignee: Akebono Brake Company, Ltd., Tokyo, Japan

[21] Appl. No.: 799,786

[22] Filed: May 23, 1977

Related U.S. Application Data

[63] Continuation of Ser. No. 631,675, Nov. 13, 1975, abandoned.

[51] Int. Cl.² ............................................. F16D 65/02
[52] U.S. Cl. .................................................. 188/73.3
[58] Field of Search ................... 188/72 A, 73.3, 73.6

[56] References Cited

U.S. PATENT DOCUMENTS

| 2,533,186 | 12/1950 | Bricker et al. ........................ 188/73.3 |
| 3,392,809 | 7/1968 | Hodkinson et al. ................. 188/73.3 |
| 3,805,925 | 4/1974 | Schoenkenz ........................ 188/73.3 |
| 3,893,546 | 7/1975 | Kestermeier et al. ............. 188/73.3 |
| 3,930,564 | 1/1976 | Kobayashi et al. ................. 188/73.3 |
| 3,935,927 | 2/1976 | Haraikawa ......................... 188/73.3 |
| 4,018,309 | 4/1977 | Mery ................................... 188/72.4 |
| 4,030,577 | 6/1977 | Ogawa et al. ...................... 188/73.3 |
| 4,031,986 | 6/1971 | Thompson ......................... 188/73.3 |

FOREIGN PATENT DOCUMENTS

| 2,014,468 | 10/1970 | Fed. Rep. of Germany ......... 188/73.3 |
| 2,416,348 | 10/1974 | Fed. Rep. of Germany ......... 188/73.6 |

Primary Examiner—Trygve M. Blix
Assistant Examiner—Edward R. Kazenske
Attorney, Agent, or Firm—Armstrong, Nikaido, Marmelstein & Kubovcik

[57] ABSTRACT

This invention in general relates to a disc brake having a caliper attached to a support secured to a structural part of a vehicle or an attachment thereto to brake the vehicle by causing the members of the caliper to press friction pads against both sides of a disc rotor which is connected to the vehicle, and, more particularly to an improvement in the disc brake of such a type effected by removing the protrudent parts that have conventionally been provided on the front of the support confronting the disc rotor and by thus making the support into a shape that permits insertion of the disc rotor through the front thereof for easy mounting of the disc brake on the vehicle. The improved construction of the disc brake is particularly suitable for use in large vehicles.

3 Claims, 9 Drawing Figures

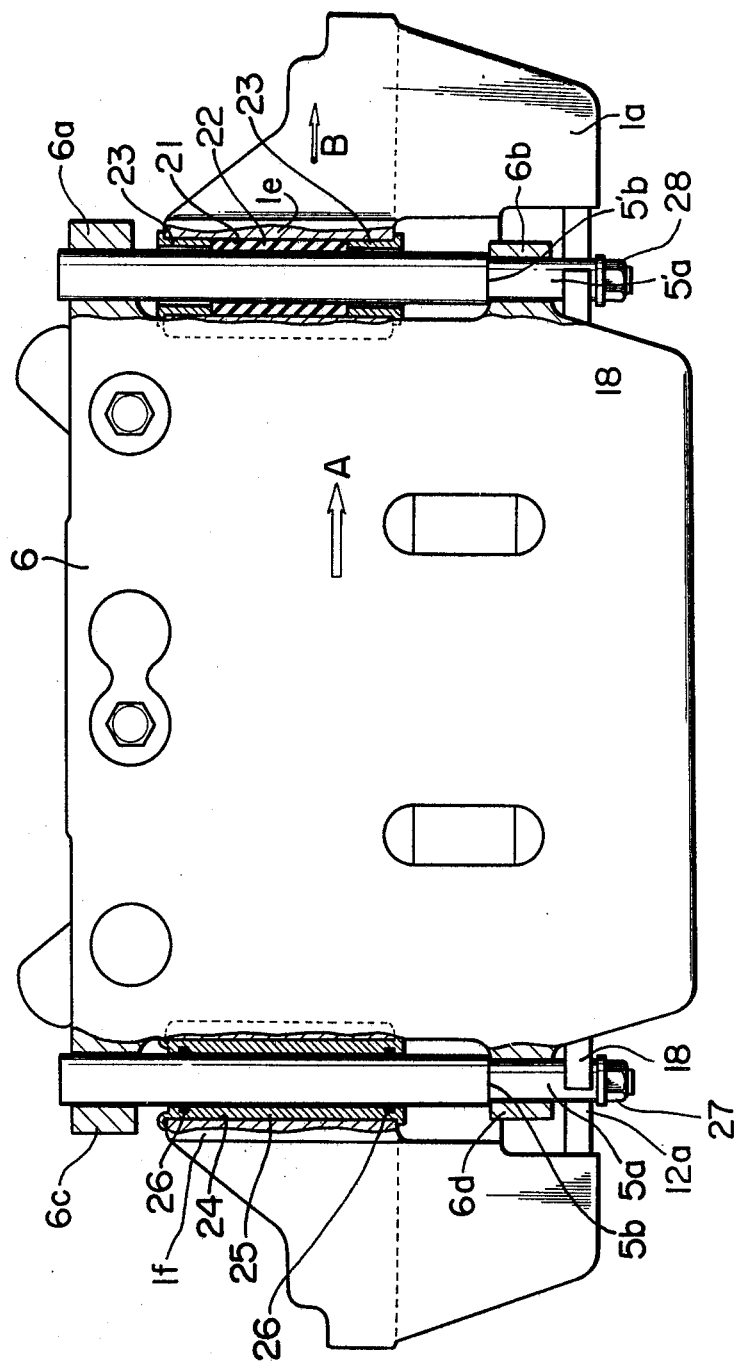

DISC BRAKE CALIPER AND SUPPORTING MEMBER

This is a continuation of application Ser. No. 631,675, filed Nov. 13, 1975, now abandoned.

BACKGROUND OF THE INVENTION

In the conventional disc brake of this type, guide grooves which engage with a front friction pad are provided in protrudent parts formed on the front sides of a support. Whereas, in accordance with this invention, such an arrangement for guiding the front friction pad is replaced with the provision of extended back plate portions which extend from sides of the metal back plate of the front friction pad and are received by the peripheral walls of the support. The extended portions of the back plate are provided with claws which engage with pins arranged to guide the movement of the caliper. The pin arrangement for guiding the caliper is provided with an elastic cover on one side thereof located in the rotating direction of the disc rotor and between a pin and a sleeve for the purpose of preventing the deformation of the pin arrangement and uneven wear of the friction pads.

BRIEF DESCRIPTION OF DRAWINGS

FIG. 1 is a front view of the conventional disc brake;

FIG. 2 a sectional view illustrating it across the II—II line shown in FIG. 1; and FIG. 3 another sectional view illustrating it across the III—III line of FIG. 1;

FIG. 4 is a front view of the first embodiment;

FIG. 5 a plan view of it;

FIG. 6 a sectional view illustrating it across the VI—VI line of FIG. 5;

FIG. 7 illustrates the inner face of the rear friction pad of the embodiment; and FIG. 8 illustrates the inner face of the front friction pad of the embodiment.

FIG. 9 is a plan view of a second embodiment.

DETAILED DESCRIPTION OF THIS INVENTION

This invention is directed to the provision of an improved disc brake which can be easily mounted on a structural part of a vehicle and which is suitable particularly for a large vehicle.

Figure 1:
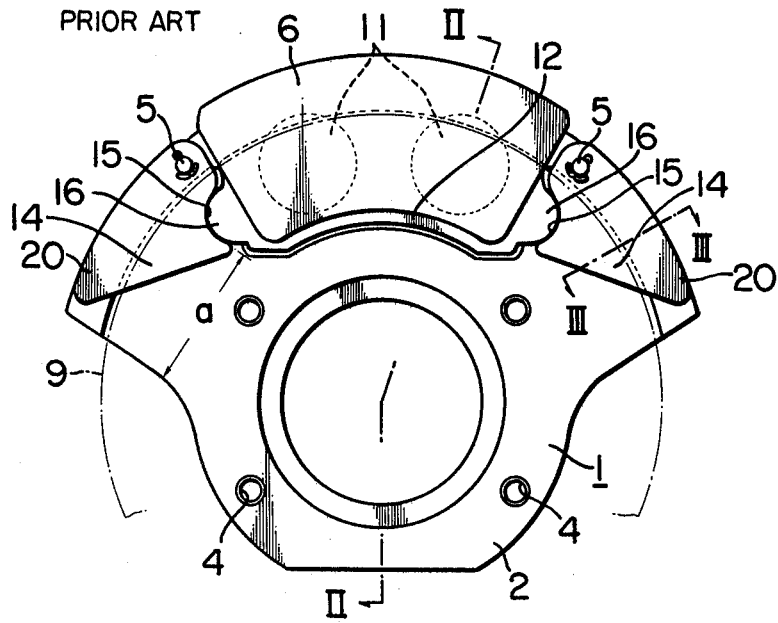
FIGS. 1 through 3 illustrate a conventional disc brake.
Figure 2:
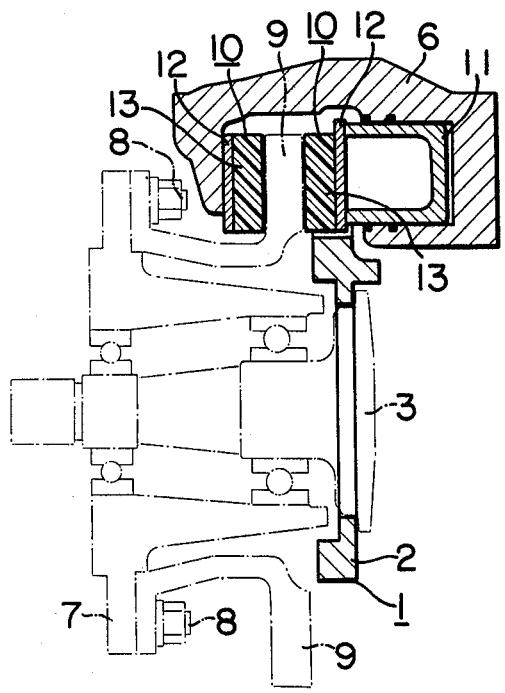
Figure 3:
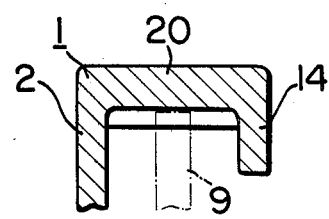

Referring to FIGS. 1 through 3 which illustrate an example of disc brakes conventionally used for a large vehicles, a disc shaped mounting part 2 of a support 1 is mated with a knuckle 3 of the vehicle and is secured thereto with unillustrated bolts screwed into screw holes 4. Two pins 5 and 5' are horizontally fitted to the upper part of the support 1. A caliper assembly 6 is mounted on the support 1 in such a way as to be freely slidable back and forth with both ends loosely fitted on the pins 5 and 5'. Front and rear friction pads 10 are disposed on both sides of a disc rotor 9 which is connected to a hub 7 by means of bolts 8 which are planted in a wheel. These friction pads 10 are sandwiched in between pistons 11 disposed in the rear portion of the caliper assembly and the fore end portion thereof. A lining 13 attached to the back metal plate 12 of the rear friction pad is pushed against the disc rotor 9 by the piston 11 as it is thrust forward by means of hydraulic pressure. The caliper is then moved backward by the reaction of the hydraulic pressure. By this backward movement of the caliper, the front friction pad 10 is also pressed against the disc rotor 9 to effect a braking operation. In order to support the weight of the friction pads, to sustain the braking torque and also to guide the forward and backward movements of the pads during the braking operation, the support 1 is provided with two protrudent portion 14 which protrude downward from the mounting portion and the peripheral walls of the support 1. The protrusions 14 are provided with guide grooves 15. Protrusions 16 which are provided on the metal back plates 12 of the front and rear friction pads engage with the guide grooves 15 respectively, so that the braking torque can be received by the support 1 through this arrangement. The conventional disc brake of the above stated construction is mounted on a vehicle in accordance with the following steps:

(1) Combine the disc rotor 9 with the disc brake which comprises the support, caliper assembly and friction pads.

(2) The combination of the disc brake and the disc rotor is attached to the knuckle at the mounting portion 2 of the support. The disc rotor 9 is put in place and is still movable back and forth and up and down round the knuckle spindle.

(3) The hub 7 is pushed into the central part of the disc rotor. The bolts 8 are aligned with the bolt holes of the disc rotor and the hub 7 is attached to the knuckle 3.

(4) The bolts are tightened with nuts to fasten the disc rotor to the hub 7 to complete the disc brake mounting work.

In carrying out such work, the heavy hub and brake must be set in place by aligning the bolts 8 and the bolts holes of the hub and tightening nuts within a very narrow space available for the work. However, if the protrusions 14 of the support 1 can be removed, the disc rotor 9 may be fastened to the hub 7 using bolts 8 in a wider working space beforehand and the assembled brake may be attached to the knuckle 3 using the mounting portion 2 of the suppot 1. By pulling out one of the pins 5, the caliper 6 then may be rotated upward on the other pin 5 to set it in an upright position. The disc rotor 9 then may be coupled to the brake without difficulty through such arrangement. However, with the protrusions 14 removed, it becomes impossible to provide the guide groove 15 for guiding the front friction pad 10.

It is therefore the principal object of this invention to provide a disc brake which facilitates the assembling work by solving the above described problem. In accordance with this invention, the protrusions 14 are removed from the front of the support and, at the same time, both sides of the metal back plate of the front friction pad are extended and supported by the peripheral wall of the support; while the mounting portion in the rear of the support are arranged in the same manner as the conventional disc brake. This modification not only facilitates the hub fitting work but also prevents the support from losing its strength.

Figure 4:
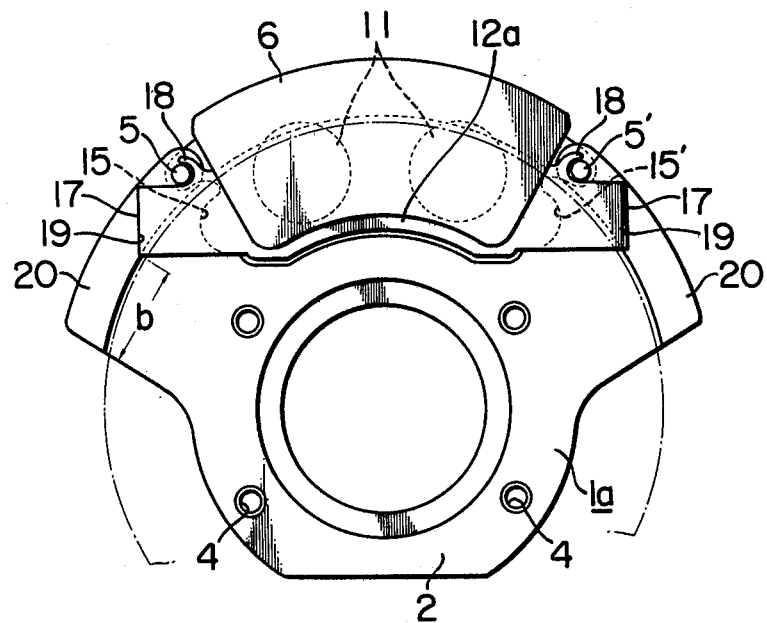
FIGS. 4 through 8 illustrate a first embodiment of this invention.
Figure 5:
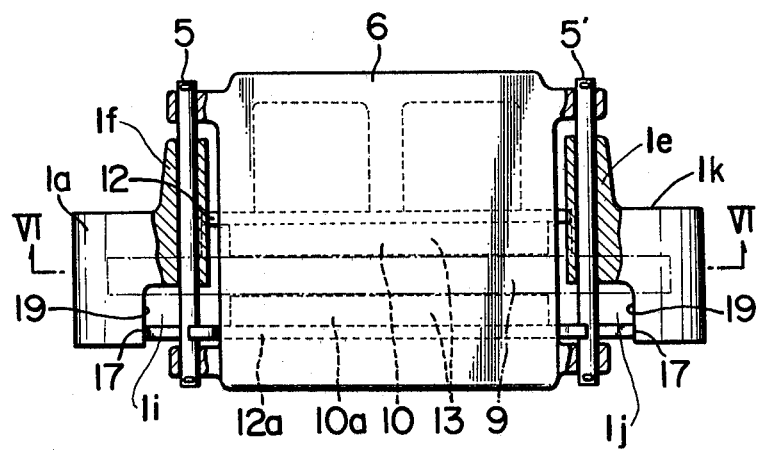
Figure 6:
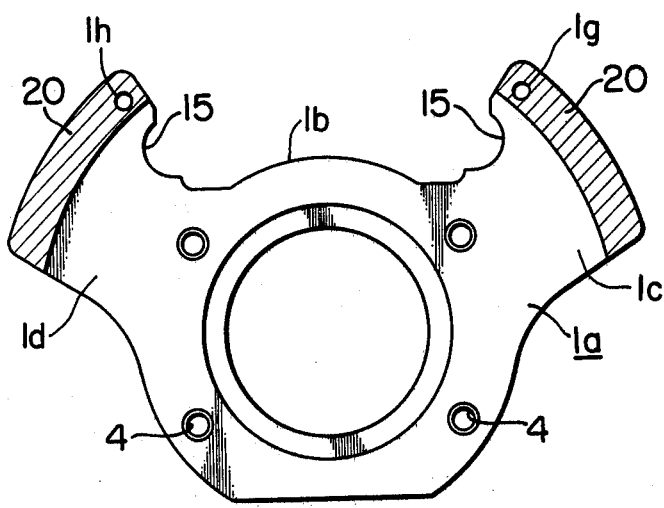

Further objects, features and disadvantages of this invention will become apparent from the following detailed description of a preferred embodiment, taken in conjunction with FIGS. 4 through 8, wherein:

Referring to FIGS. 4–6, the support 1a is formed with a pair of arms 1c and 1d extending in a radial direction of the disc rotor 9 with a space defining an opening 1b. The peripheral walls 20 extend from outer ends of the arms 1c and 1d in an axial direction of the disc rotor beyond the disc rotor and are located radially beyond the periphery of the disc rotor. Further, notches 1i and 1j are formed by the peripheral walls 20 facing each other and extending from the outer edge of peripheral walls 20 in the axial direction to a point which is in front of the inner face of the disc rotor. The arms are provided with boss portions 1e and 1f which extend from the inner edge 1k of the arms. Support holes 1g and 1h pass through the peripheral walls 20 and the boss portions 1e and 1f.

The support 1a is formed by removing the protrusions 14 which are formed on the front part of the peripheral walls 20 of the conventional support 1. Thus the disc rotor 9 can be inserted from the front of the support. The thickness of the pins 5 and 5' is the same as that of the conventional ones. Therefore, the thickness of the support and the dimensions of the caliper assembly also remain the same as those of the conventional arrangement.

Figure 7:
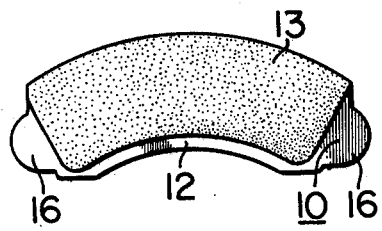

The mounting portion 2 in the rear part of the support 1a is formed in the same manner as the conventional support 1 with the guide groove 15 also provided for guiding the rear friction pad 10. Accordingly, the rear friction pad is of the same shape as the conventional one as shown in FIG. 7 with protrusions 16 also provided for engagement with the groove.

Figure 8:
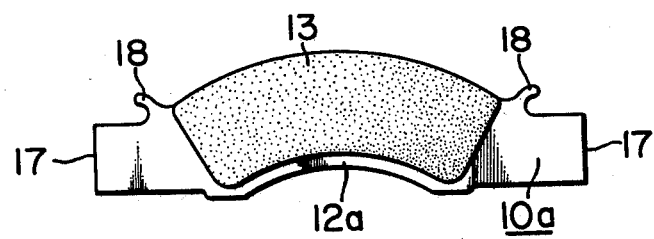

The front friction pad 10a is of a shape as illustrated in FIG. 8. The two sides 17 of the back plate 12a of the front friction pad are arranged to have straight edge faces. The upper left and right sides of the back plate 12a are formed into the shape of claws 18 which engage with the pins 5, 5' to support the weight of the friction pad. The dimensions and the shape of the lining 13 remain the same as the conventional one.

In response to the shape of the back plate 12a, the front peripheral walls 20 of the support 1a are provided with receiving faces 19 to provide for sliding contact with the straight edge faces of the back plate 12a.

With the disc brake thus constructed as described in the foregoing, it is mounted on a vehicle such as an automobile in the following manner:

(1) The disc brake which has been assembled is attached to the knuckle 3 at the mounting portion 2.

(2) One of the two pins 5 is pulled out. The caliper assembly is rotated upward on the other pin 5'. The rear friction pad 10 is engaged with the guide grooves 15 of the protrusions on both sides of the support beforehand while the front friction pad 10a is left removed.

(3) The disc rotor 9 is attached to the hub 7 with bolts 8 beforehand. The work presents no problem as it can be done in an ample working space. The hub is then fitted to the knuckle 3. Since the support is not provided with the conventional protrusions 14 and the caliper is in an upright position, the disc rotor can be inserted in the support without any obstructions. The hub can be readily coupled to the knuckle.

(4) Next, the front friction pad 10a which has been removed is put in front of the disc rotor 9. One of the claws 18 is engaged with one of the pins 5 which has been left there: With the friction pads 10 and 10a thus positioned on both sides of the disc rotor 9, the caliper 6 is returned to the original position to have the friction pads in between caliper members. The pin 5 which has been pulled out is then inserted through the support, the caliper and the other claw of the pack plate of the friction pad to complete the installation of the disc brake.

In this manner, the disc brake of this invention can be quite easily installed in place without the difficult work that has been required for the conventional disc brake of this type involving the alignment of the bolts 8 and the bolt holes of the disc rotor while supporting the heavy disc rotor by hand in coupling the hub 7 to the knuckle 3 and then the tightening of the bolts 8 with nuts within a narrow working space.

In a disc brake, it is the mounting portion 2 of the support secured to a vehicle body that sustains the braking torque. In the conventional structure, the mounting portion 2 is sufficiently strong as the distance "a" between the guide groove 15 and the side edge of the mounting portion 2 is great enough as shown in FIG. 1. However, if the structure of the front friction pad were adopted in the same manner also for the rear friction pad to support the straight side edge faces 17 with the receiving faces 19, the distance "b" (FIG. 4) between each receiving face 19 and each side edge of the mounting portion would become short. Then, in order to strengthen the mounting portion, either the side of the mounting portion should be extended outward or the thickness of the mounting portion should be increased. Generally, however, such modification in the dimensions of a disc brake is difficult without modification also in the existing structure of the vehicle for mounting the modified disc brake.

Whereas, in accordance with this invention, the front friction pad is supported by the receiving faces 19 of the peripheral walls of the support while the rear friction pad is mounted in the same way as in the conventional arrangement. In this manner, the disc brake can be manufactured with its outside dimensions remaining almost unchanged from those of the conventional disc brake while there is no reduction in the strength of the mounting portion of the support.

The construction of the disc brake being as described above, the diameter of the pins 5 and 5' and the thickness of the support can be left unchanged from the conventional arrangement; and the disc brake thus permits insertion of a disc rotor from the front to facilitate the work of mounting it on a vehicle. This is a great advantage over the conventional disc brakes of this type.

Furthermore, in a floating caliper type disc brake wherein the caliper is connected to a support with a pin arrangement, the portion of the support on the external side of the pin arrangement which is located in the direction of disc rotor rotation tends to be deformed. This tends to cause uneven wear of the friction pads and eventually an inadequate braking operation.

Whereas, in accordance with this invention, such a shortcoming of the conventional floating type disc brake is eliminated with the provision of an elastic cover on the sleeve of the pin located on the side in the direction of the disc rotor rotation. This arrangement will be understood from the following description of another embodiment of this invention with reference to FIG. 9 wherein: Pairs of ear portions 6a and 6b, and 6c and 6d are provided on both ends of the caliper 6 on opposite sides of the disc rotor. These ear portions are respectively provided with an opening. Pins 5a and 5'a each having large and small diameter portions are fitted into the openings of the ear portions 6a–6d. The ends of pins 5a and 5'a of small diameter are fitted with nuts 27 and 28 so as to prevent the front friction pad 10a supported by the claws 18 between the nuts 27 and 28, the ear portions 6d and 6b, and the pins 5a and 5'a from coming off.

When the disc rotor 9 rotates in the direction of an arrow A in FIG. 9, an elastic cover 22 such as rubber, etc. is fitted into between a pin 5'a and a supporting hole 21 of a support 1a at a side in the direction of the disc rotor rotation. Metal or plastic sleeves 23 are press fitted to the both ends of the supporting hole 21 so as to prevent the cover 22 slipping out of the supporting hole 21 so that the pin 5'a can slide in the cover 22. On the reverse side in the forward direction of the disc rotor rotation, a metal sleeve 25 having a flange 25' is inserted into a supporting hole 24 and bent at one end to prevent the former slipping out of the latter so that a pin 5a can slide in the sleeve 25. Seals 26 are provided between the pin 5a and the sleeve 25.

During the brake operation, the pins 5a and 5'a move with the caliper 6 towards the top of FIG. 9 since shoulders 5b and 5'b of the pins 5a and 5'a contact with the caliper 6. B point of the support 1a of FIG. 9 deforms in the direction of an arrow B which is same as that of the disc rotor rotation. However, the caliper 6 is not affected by the deformation of the support 1a which is absorbed by the elastic cover 22 provided to the pin 5'a at the side in the direction of the disc rotor rotation and the caliper 6 is guided by the other pin 5a in the sleeve 25 and slides accurately in a parallel direction with the rotor axis so that the friction pads cause no uneven wear. Moreover, the arrangement of the cover 22 being provided to the supporting pin 5'a not only prevents to transmit the vibration of the vehicle to the caliper 6 but also enhances the work and assembly of those supporting pin and hole. In the example of FIG. 9, the front friction pad 10a (not indicated), can be removed in such a manner that if the pin 5'a and the nut 27 are removed and the caliper 6 is rotated around the axis of the pin 5a, the front friction pad is extracted outwardly while maintaining the parallel condition between the friction pad 10a and the braking surface of the disc rotor 9 (not indicated).

What is claimed is:
1. A disc brake for a vehicle comprising:
   a rotatable disc rotor;
   a caliper having an operating portion on one side of said disc rotor, a reacting portion on the other side of said disc rotor and a pair of ear portions respectively located on both sides of said caliper in peripheral directions of said rotor and on opposite sides of said disc rotor;
   a support member fixed to a stationary portion of said vehicle on said one side of said disc rotor, said support member including a pair of arms extending in a radial direction with a space defining an opening between said arms, guide grooves provided on said arms facing each other in said opening, a boss portion being provided on each of said side arms and each boss portion being respectively provided with a supporting hole extending parallel with the axis of said disc rotor, and peripheral walls extending from the outer ends of said arms in the axial direction of said disc rotor beyond the outer periphery of said disc rotor, said peripheral walls having ends, said ends of said peripheral walls being provided with torque receiving faces;
   a pair of pins engaged with said supporting holes of said support member and openings in said ear portions of said caliper for guiding said caliper in the axial direction of said disc rotor; and
   a pair of friction pads positioned on opposite sides of said disc rotor, one of said friction pads having a back plate being provided with protrusions slidably engaging said guide grooves of said support member and the other of said friction pads having a back plate being supported by said pins positioned between said reacting portion of said caliper and respectively one of said pair of said ear portions located on said other side of said disc rotor so as to permit slidable engagement with said torque receiving faces.

2. A disc brake as defined in claim 1, wherein said pair of pins are provided with large and small diameter portions and a shoulder therebetween, intermediate portions of said large diameter portions engaging said supporting holes, wherein the ends of said large diameter portions of said pins are engaged with said openings of said ear portions on said one side of said disc rotor and said small diameter portions of said pins are engaged with said openings of said ear portions on said other side of said disc rotor such that said ear portions at said other side are operatively engaged with said shoulders of said pins and wherein the ends of said small diameter portions of said pins are provided with stopping means so that said small diameter portions of said pins support said other friction pad between said stopping means and said ear portions at said other side.

3. A disc brake as defined in claim 2, including sleeves fixed to both ends of said supporting hole of said support member located on the side of said caliper in the forward direction of said disc rotor rotation and an elastic cover provided between said sleeves and between said supporting hole, and said pin inserted therein, wherein a clearance is provided between an inner surface of each of said sleeves and an outer surface of said pin.

* * * * *